3,098,039
PROCESS FOR THE CONTROL OF BACTERIA
Edward B. Hodge, Terre Haute, Ind., assignor to Commercial Solvents Corporation, New York, N.Y., a corporation of Maryland
No Drawing. Filed Oct. 28, 1960, Ser. No. 65,566
4 Claims. (Cl. 252—8.55)

My invention relates to the control of bacteria in water-flooding operations used in the secondary recovery of petroleum oils and more particularly to the control of such organisms by incorporating into the flooding water effecting amounts of esters formed from the condensation of lower nitroalkanols and alkyl carboxylic acids selected from the group consisting of dibasic and tribasic acids having up to and including six carbon atoms.

U.S. Patent 2,839,467 lists many of the problems found in the secondary oil recovery art and the means whereby some of these problems have been solved. The problem of controlling sulfate-reducing bacteria is ever present and always difficult as the growth of the microorganisms is not controlled by economically practical amounts of many bactericides generally utilized in bacterial control and the microorganisms sometimes become resistant to generally used bactericides.

The problems attending the control of microorganisms other than those of the sulfate-reducing type are more easily solved but are, nevertheless, present. These organisms are generally controlled by moderate amounts of known bactericides.

I have now discovered that noxious organisms present in water flooding operations are economically controlled by nitro-substituted alkyl esters formed from the condensation of lower nitroalkanols and alkyl carboxylic acids selected from the group consisting of dibasic and tribasic acids having up to and including six carbon atoms. Compounds which I have found to be operative in my present process include bis(2-nitrobutyl) adipate, tris(2-nitrobutyl) citrate, bis(2-nitrobutyl) tartrate, bis(2-nitrobutyl) oxalate, bis(2-nitroethyl) adipate.

The nitro-substituted alkyl esters utilized in my invention can be produced by the condensation of a lower nitroalkanol with a dibasic or tribasic acid in the presence of an acid catalyst. In preparing the nitro-substituted alkyl esters by condensation of a lower nitroalkanol with a dibasic or tribasic acid, I prefer to first form a benzene solution of the acid and the nitroalcohol using approximately a 10% excess of the theoretically reactant amount of the nitroalcohol, reflux the said solution in the presence of an acid catalyst such as sulfuric acid or paratoluenesulfonic acid until the final product is formed in the reaction mixture. The product is then recovered from the reaction mixture by subsequently cooling, washing, and concentrating the mixture to obtain the desired product.

The usual procedure for treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil-bearing subterranean formation. Sampling and checking of the water for sulfate-reducing bacteria will show whether the chemical concentration needs to be raised or perhaps lowered to control effectively the bacteria count of the flooding water.

Alternately the bactericides utilized in my process can be added to the oil-bearing formations periodically, for example, once a week as a high-potency concentrate, or the undiluted bactericide may be injected into the formation.

I have found that the compounds utilized in my process are active against some strains of bacteria in water at concentrations as low as 10–25 p.p.m. and at times as high as 100 p.p.m. as I have found that even very resistant strains of *Desulfovibrio desulfuricans* are effectively controlled at these concentrations.

It is to be understood, of course, that not all of the compounds used in my process are effective to the same degree. The following table sets out the concentrations at which I have found representative nitro-substituted alkyl esters to be completely effective against resistant strains of *Desulfovibrio desulfuricans* in water-flooding operations.

| Nitro-substituted alkyl esters: | Effective concentration, p.p.m. |
|---|---|
| Bis(2-nitrobutyl) adipate | 10 |
| Tris(2-nitrobutyl) citrate | 25 |
| Bis(2-nitrobutyl) tartrate | 10 |

The following examples illustrate the use of my nitro-substituted alkyl esters in the control of sulfate-reducing microorganisms in water flooding operations. It is not intended that my invention be limited to the exact compositions or concentrations shown. Rather, it is intended that all equivalents obvious to those skilled in the art be included within the scope of my invention as claimed.

*Example I*

In a water-treatment plant, a water concentrate containing bis(2-nitrobutyl) adipate is continuously added to water to be pumped into subterranean oil-bearing formations at such a rate that a 25 p.p.m. solution of the compound is formed. The thus treated flooding water is pumped into the oil-bearing formation and is completely effective in preventing bacterial plugging of the oil-bearing sands in the piping system utilized in the water-flooding operations.

*Example II*

Utilizing the process of Example I, I have found that 25 p.p.m. of tris(2-nitrobutyl) citrate is effective in controlling sulfate-reducing bacteria in water-flooding operations.

*Example III*

Utilizing the process of Example I, I have found that 10 p.p.m. of bis(2-nitrobutyl) tartrate is effective in controlling sulfate-reducing bacteria in water-flooding operations.

*Example IV*

Utilizing the process of Example I, I have found that 100 p.p.m. of bis(2-nitrobutyl) oxalate is effective in controlling sulfate-reducing bacteria in water-flooding operations.

Now having described my invention, what I claim is:
1. In a process of secondary oil recovery characterized by the step of injecting flooding water into oil-bearing subterranean formations to displace portions of the residual oil therein, the improvement which comprises incorporating in the said injected flooding water in excess of 10–25 parts per million of a nitro-substituted alkyl ester formed from the condensation of lower nitroalkanols and alkyl carboxylic acids selected from the group consisting of tartaric acid, citric acid, and adipic acid to inhibit the growth of bacteria within said formations.

2. The process of claim 1 wherein the nitro-substituted alkyl ester is bis(2-nitrobutyl) adipate.

3. The process of claim 1 wherein the nitro-substituted alkyl ester is tris(2-nitrobutyl) citrate.

4. The process of claim 1 wherein the nitro-substituted alkyl ester is bis(2-nitrobutyl) tartrate.

References Cited in the file of this patent

UNITED STATES PATENTS

| | | |
|---|---|---|
| 2,692,231 | Stayner et al. | Oct. 19, 1954 |
| 2,976,236 | Bennett et al. | Mar. 21, 1961 |
| 2,979,455 | Bennett et al. | Apr. 11, 1961 |
| 3,001,935 | Bennett et al. | Sept. 26, 1961 |

FOREIGN PATENTS

| | | |
|---|---|---|
| 107,419 | Australia | May 25, 1939 |
| 421,189 | Italy | Mar. 19, 1947 |